US010218816B2

(12) United States Patent
Kobayashi

(10) Patent No.: US 10,218,816 B2
(45) Date of Patent: Feb. 26, 2019

(54) INFORMATION PROCESSING SYSTEM, INFORMATION PROCESSING METHOD, SERVER, AND CONTROL METHOD AND CONTROL PROGRAM OF SERVER

(71) Applicant: Yoshikazu Kobayashi, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 14/387,452

(22) PCT Filed: Feb. 25, 2013

(86) PCT No.: PCT/JP2013/054699
§ 371 (c)(1),
(2) Date: Sep. 23, 2014

(87) PCT Pub. No.: WO2013/140950
PCT Pub. Date: Sep. 26, 2013

(65) Prior Publication Data

US 2015/0052190 A1 Feb. 19, 2015

(30) Foreign Application Priority Data

Mar. 23, 2012 (JP) ................................ 2012-068414

(51) Int. Cl.
*G06F 15/16* (2006.01)
*H04L 29/06* (2006.01)
(Continued)

(52) U.S. Cl.
CPC ............ *H04L 67/42* (2013.01); *G06F 13/385* (2013.01); *H04L 67/16* (2013.01); *H04L 67/34* (2013.01); *G06F 2213/0058* (2013.01)

(58) Field of Classification Search
CPC . H04L 12/2803; H04L 67/42; H04L 63/1408; H04L 63/1425; H04L 12/2818;
(Continued)

(56) References Cited

U.S. PATENT DOCUMENTS 5,740,801 A * 4/1998 Branson ................ G06F 19/321 128/920
2001/0009424 A1 7/2001 Sekiguchi
(Continued)

FOREIGN PATENT DOCUMENTS

JP 2001-202317 7/2001
JP 2005-102156 4/2005
(Continued)

OTHER PUBLICATIONS

International Search Report dated May 14, 2013 in corresponding PCT International Application.
(Continued)

*Primary Examiner* — Michael A Keller
*Assistant Examiner* — Thao D Duong
(74) *Attorney, Agent, or Firm* — Finnegan, Henderson, Farabow, Garrett & Dunner, L.L.P.

(57) ABSTRACT

An embodiment of this invention is directed to an information processing system including a communication apparatus including an IP interface and a non-IP interface and capable of connecting to the Internet, an input device, and an output device, and a server capable of communicating with the communication apparatus via the IP interface. The server stores the combination of the input device and the output device connected to the non-IP interface of the communication apparatus and an operation to be performed by the input device or the output device in association with each other, detects the input device and the output device connected to the non-IP interface of the communication appa-
(Continued)

ratus, decides the operation to be performed by the input device or the output device upon detecting the input device and the output device connected to the non-IP interface of the communication apparatus, and instructs the input device or the output device to do the decided operation.

20 Claims, 11 Drawing Sheets

(51) Int. Cl.
*H04L 29/08* (2006.01)
*G06F 13/38* (2006.01)

(58) Field of Classification Search
CPC . H04L 63/1416; H04L 67/10; H04L 12/2827; H04L 51/043; H04L 51/22; G06F 21/552; G06F 11/0709; G06F 21/554; G06F 21/56; G06F 3/011; G06F 3/01
See application file for complete search history.

(56) References Cited

U.S. PATENT DOCUMENTS

| | | | | |
|---|---|---|---|---|
| 2006/0036761 | A1* | 2/2006 | Amra | H04L 67/2814 709/238 |
| 2007/0168046 | A1 | 7/2007 | Misawa et al. | |
| 2008/0005260 | A1* | 1/2008 | Belimpasakis | H04L 67/34 709/212 |
| 2008/0127226 | A1* | 5/2008 | Fujita | G06F 13/102 719/321 |
| 2008/0147909 | A1 | 6/2008 | Zhang et al. | |
| 2008/0259382 | A1* | 10/2008 | Mihara | G06K 15/00 358/1.15 |
| 2008/0309961 | A1* | 12/2008 | Aichi | H04N 1/00244 358/1.15 |
| 2010/0241772 | A1 | 9/2010 | Kugimoto et al. | |
| 2010/0271547 | A1* | 10/2010 | Kojima | H04N 21/4135 348/552 |
| 2011/0047341 | A1* | 2/2011 | Yu | G06F 11/1464 711/162 |
| 2012/0117566 | A1* | 5/2012 | Maeda | G06F 21/53 718/1 |
| 2013/0268116 | A1* | 10/2013 | Kim | G08C 17/00 700/245 |

FOREIGN PATENT DOCUMENTS

| | | |
|---|---|---|
| JP | 2008-148109 | 6/2006 |
| JP | 2009-98977 | 5/2009 |
| JP | 2009-129170 | 6/2009 |
| JP | 2010-218347 | 9/2010 |
| WO | WO 2005/013136 A1 | 2/2005 |

OTHER PUBLICATIONS

Extended European Search Report dated Nov. 5, 2015 by the European Patent Office in counterpart European Patent Application No. 13763939.9.

Notice of Reasons for Rejection from the Japanese Patent Office for counterpart Japanese Application No. 2012-068414 dated May 6, 2016.

* cited by examiner

350

| USER ID | REGISTERED DEVICE | VIRTUAL PC ASSIGNMENT |
|---|---|---|
| CONTRACT USER A | MOBILE WIRELESS ROUTER X<br>NOTEBOOK PC Y<br>SMARTPHONE S | VIRTUAL PC $\alpha$ |
| CONTRACT USER B | SMARTPHONE D<br>TABLET PC X | VIRTUAL PC $\beta$ |
| ⋮ | ⋮ | ⋮ |

| CONNECTION DESTINATION A | CONNECTION DESTINATION B | CONNECTION DESTINATION C | CONNECTION DESTINATION D | ... | APPLICATION TO BE ACTIVATED BY VIRTUAL PC |
|---|---|---|---|---|---|
| DIGITAL CAMERA | MONITOR | | | | IMAGE EDITING APPLICATION |
| DIGITAL CAMERA | MONITOR | KEYBOARD | MOUSE | | BROWSER + BLOG URL |
| KEYBOARD | MONITOR | | | | TEXT EDITING APPLICATION |
| ⋮ | ⋮ | ⋮ | ⋮ | ⋮ | ⋮ |

| | CONNECTION DESTINATION A | CONNECTION DESTINATION B | CONNECTION DESTINATION C | ... | OPERATION CORRESPONDING TO MANIPULATION |
|---|---|---|---|---|---|
| 801 | GENERAL-PURPOSE MONITOR | GENERAL-PURPOSE PRINTER | GENERAL-PURPOSE SCANNER | | PRINT BUTTON OF PRINTER ON: READ BY SCANNER AND PRINT<br>SCANNER BUTTON ON: MONITOR DISPLAY |
| 802 | DIGITAL MICROSCOPE | GENERAL-PURPOSE MONITOR | GENERAL-PURPOSE PRINTER | | DIGITAL MICROSCOPE ON: MONITOR DISPLAY<br>PRINT BUTTON OF PRINTER ON: PRINT MONITOR DISPLAY |
| 803 | GENERAL-PURPOSE KEYBOARD | GENERAL-PURPOSE MONITOR | GENERAL-PURPOSE PRINTER | | ACTIVATION OF TEXT EDITING APPLICATION<br>PRESS OF KEY OF KEYBOARD: MONITOR DISPLAY<br>PRINT BUTTON OF PRINTER ON: PRINT MONITOR DISPLAY |
| 804 | GENERAL-PURPOSE DIGITAL CAMERA | GENERAL-PURPOSE MONITOR | GENERAL-PURPOSE PRINTER | | ACTIVATION OF IMAGE EDITING APPLICATION: DISPLAY IMAGE IN CAMERA |
| 805 | GENERAL-PURPOSE DVD PLAYER | GENERAL-PURPOSE MONITOR | | | PLAYBACK BUTTON OF DVD PLAYER ON: PLAY BACK DVD AND OUTPUT VIDEO |
| 806 | GENERAL-PURPOSE IC RECORDER | GENERAL-PURPOSE SPEAKER | | | PLAYBACK BUTTON OF IC RECORDER ON: OUTPUT RECORDER AUDIO FROM SPEAKER |
| | ⋮ | ⋮ | ⋮ | ⋮ | ⋮ |

FIG. 9

INFORMATION PROCESSING SYSTEM, INFORMATION PROCESSING METHOD, SERVER, AND CONTROL METHOD AND CONTROL PROGRAM OF SERVER

CROSS-REFERENCE TO RELATED PATENT APPLICATIONS

This application is a National Stage Entry of International Application No. PCT/JP2013/054699, filed Feb. 25, 2013, which claims priority from Japanese Patent Application No. 2012-068414, filed Mar. 23, 2012. The entire contents of the above-referenced applications are expressly incorporated herein by reference.

TECHNICAL FIELD

The present invention relates to an information processing system, an information processing method, a server, and a control method and a control program of the server.

BACKGROUND ART

In the above technical field, patent literature 1 discloses a technique of causing a virtual server to control a USB device via a thin client.

CITATION LIST

Patent Literature

Patent literature 1: Japanese Patent Laid-Open No. 2010-218347

SUMMARY OF THE INVENTION

Technical Problem

However, the technique described in the above literature only assumes outputting data from the server to one USB device. Since the server does not control input/output involving two or more devices at all, the usability is poor.

The present invention enables to provide a technique of solving the above-described problem.

Solution to Problem

One aspect of the present invention provides an information processing system including a communication apparatus including an Internet protocol interface and a non-Internet protocol interface and capable of connecting to the Internet, an input device, and an output device, and a server capable of communicating with the communication apparatus via the Internet protocol interface, the server comprising:

a storage that stores a combination of the input device and the output device connected to the non-Internet protocol interface of the communication apparatus and an operation to be performed by one of the input device and the output device in association with each other;

a detector that detects the input device and the output device connected to the non-Internet protocol interface of the communication apparatus;

a decider that decides the operation to be performed by one of the input device and the output device by referring to the storage upon detecting the input device and the output device connected to the non-Internet protocol interface of the communication apparatus; and an instructor that instructs one of the input device and the output device to do the operation decided by the decider.

Another aspect of the present invention provides an information processing method using a communication apparatus including an Internet protocol interface and a non-Internet protocol interface and capable of connecting to the Internet, an input device, and an output device, and a server capable of communicating with the communication apparatus via the Internet protocol interface, the server including a storage that stores a combination of the input device and the output device connected to the non-Internet protocol interface of the communication apparatus and an operation to be performed by one of the input device and the output device in association with each other, the method comprising:

detecting the input device and the output device connected to the non-Internet protocol interface of the communication apparatus;

deciding the operation to be performed by one of the input device and the output device by referring to the storage upon detecting the input device and the output device connected to the non-Internet protocol interface of the communication apparatus; and instructing one of the input device and the output device to do the operation decided in the deciding.

Still other aspect of the present invention provides a server capable of communicating, via an Internet protocol interface, with a communication apparatus including the Internet protocol interface and a non-Internet protocol interface and capable of connecting to the Internet, an input device, and an output device, comprising:

a storage that stores a combination of the input device and the output device connected to the non-Internet protocol interface of the communication apparatus and an operation to be performed by one of the input device and the output device in association with each other;

a detector that detects the input device and the output device connected to the non-Internet protocol interface of the communication apparatus;

a decider that decides the operation to be performed by one of the input device and the output device by referring to the storage upon detecting the input device and the output device connected to the non-Internet protocol interface of the communication apparatus; and an instructor that instructs one of the input device and the output device to do the operation decided by the decider.

Still other aspect of the present invention provides a control method of a server capable of communicating, via an Internet protocol interface, with a communication apparatus including the Internet protocol interface and a non-Internet protocol interface and capable of connecting to the Internet, an input device, and an output device, the method comprising:

detecting the input device and the output device connected to the non-Internet protocol interface of the communication apparatus;

deciding an operation to be performed by one of the input device and the output device by referring to a storage that stores a combination of the input device and the output device connected to the non-Internet protocol interface of the communication apparatus and the operation to be performed by one of the input device and the output device in association with each other upon detecting the input device and the output device connected to the non-Internet protocol interface of the communication apparatus; and instructing one of the input device and the output device to do the operation decided in the deciding.

Still other aspect of the present invention provides a control program of a server capable of communicating, via an Internet protocol interface, with a communication apparatus including the Internet protocol interface and a non-Internet protocol interface and capable of connecting to the Internet, an input device, and an output device, the program causing a computer to execute:

detecting the input device and the output device connected to the non-Internet protocol interface of the communication apparatus;

deciding an operation to be performed by one of the input device and the output device by referring to a storage that stores a combination of the input device and the output device connected to the non-Internet protocol interface of the communication apparatus and the operation to be performed by one of the input device and the output device in association with each other upon detecting the input device and the output device connected to the non-Internet protocol interface of the communication apparatus; and instructing one of the input device and the output device to do the operation decided in the deciding.

Advantageous Effects of Invention

According to the present invention, it is possible to more easily control input and output devices using a communication apparatus.

BRIEF DESCRIPTION OF DRAWINGS

FIG. 3B is a view showing a table prepared in a cloud server according to the second embodiment of the present invention;

FIG. 8 is a view showing a table prepared in the cloud server according to the second embodiment of the present invention; and FIG. 9 is a view showing a table prepared in the cloud server according to the second embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
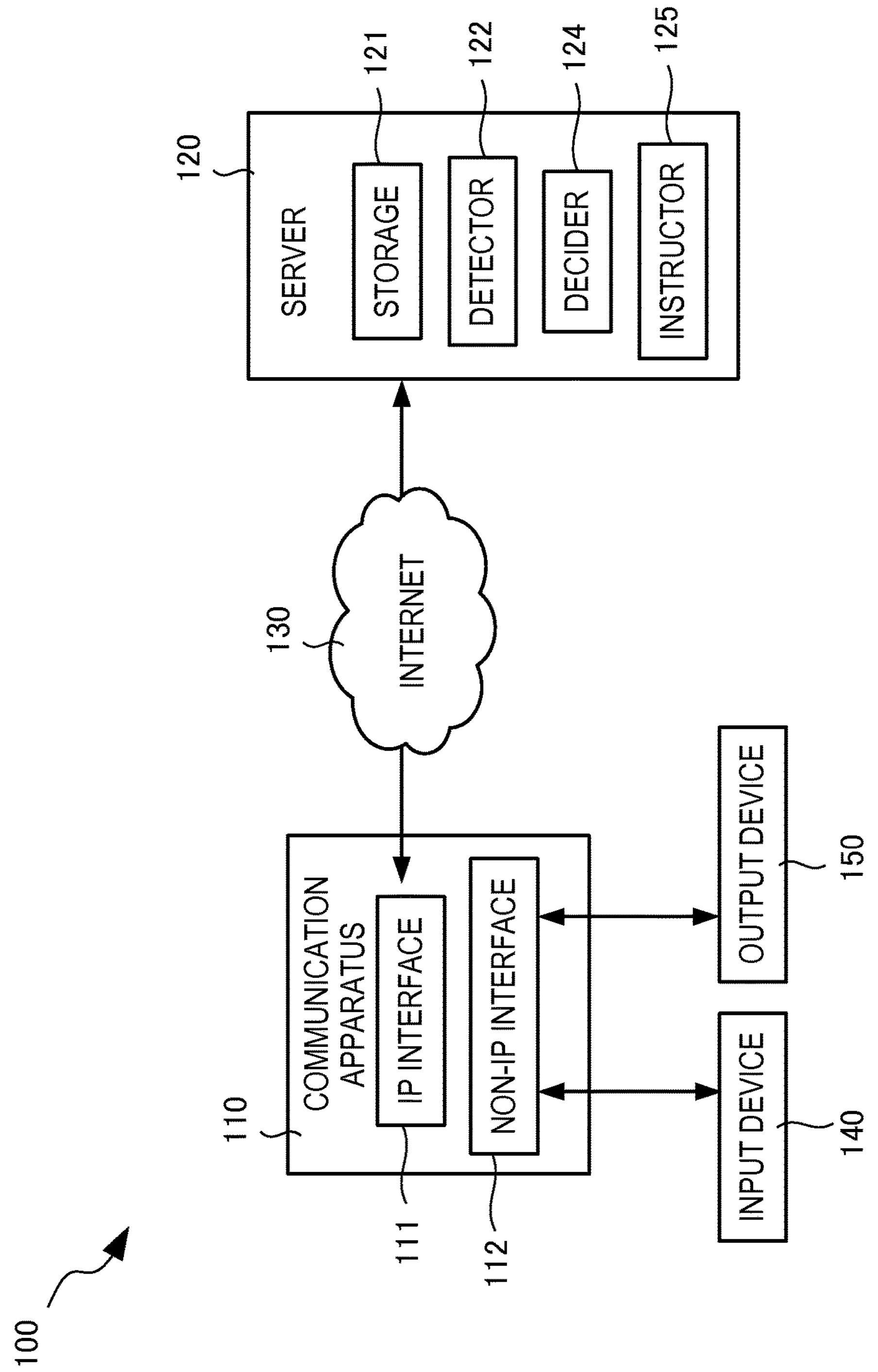
FIG. 1 is a block diagram showing the arrangement of an information processing system according to the first embodiment of the present invention.

An information processing system 100 according to the first embodiment of the present invention will be described with reference to FIG. 1. The information processing system 100 includes a communication apparatus 110 and a server 120 which can communicate with each other.

The communication apparatus 110 includes an Internet protocol interface (IP interface in FIG. 1) 111 and a non-Internet protocol interface (non-IP interface in FIG. 1) 112 and can be connected to both the Internet 130 and an input device 140 and an output device 150.

The server 120 can communicate with the communication apparatus 110 via the Internet protocol interface 111 and the Internet 130.

The server 120 includes a storage 121, a detector 122, a decider 124, and an instructor 125.

The storage 121 stores the combination of the input device 140 and the output device 150 connected to the non-Internet protocol interface 112 of the communication apparatus 110 and an operation to be performed by the input device 140 or the output device 150 in response to a user manipulation on the input device 140 or the output device 150 in association with each other.

The detector 122 detects the input device 140 and the output device 150 connected to the non-Internet protocol interface 112 of the communication apparatus 110.

Upon detecting the input device 140 and the output device 150 connected to the non-Internet protocol interface 112 of the communication apparatus 110, the decider 124 decides an operation to be performed by the input device or the output device by referring to the storage 121.

The instructor 125 instructs the input device 140 or the output device 150 to do the operation decided by the decider 124.

With the above arrangement, only by connecting the input device 140 and the output device 150 to the communication apparatus 110, the server 120 can decide an appropriate operation and obtain an output from the output device 150 based on data input from the input device. That is, it is possible to control the input and output devices using the server in a more user-friendly form.

Second Embodiment

<Overall Arrangement>

Figure 2:
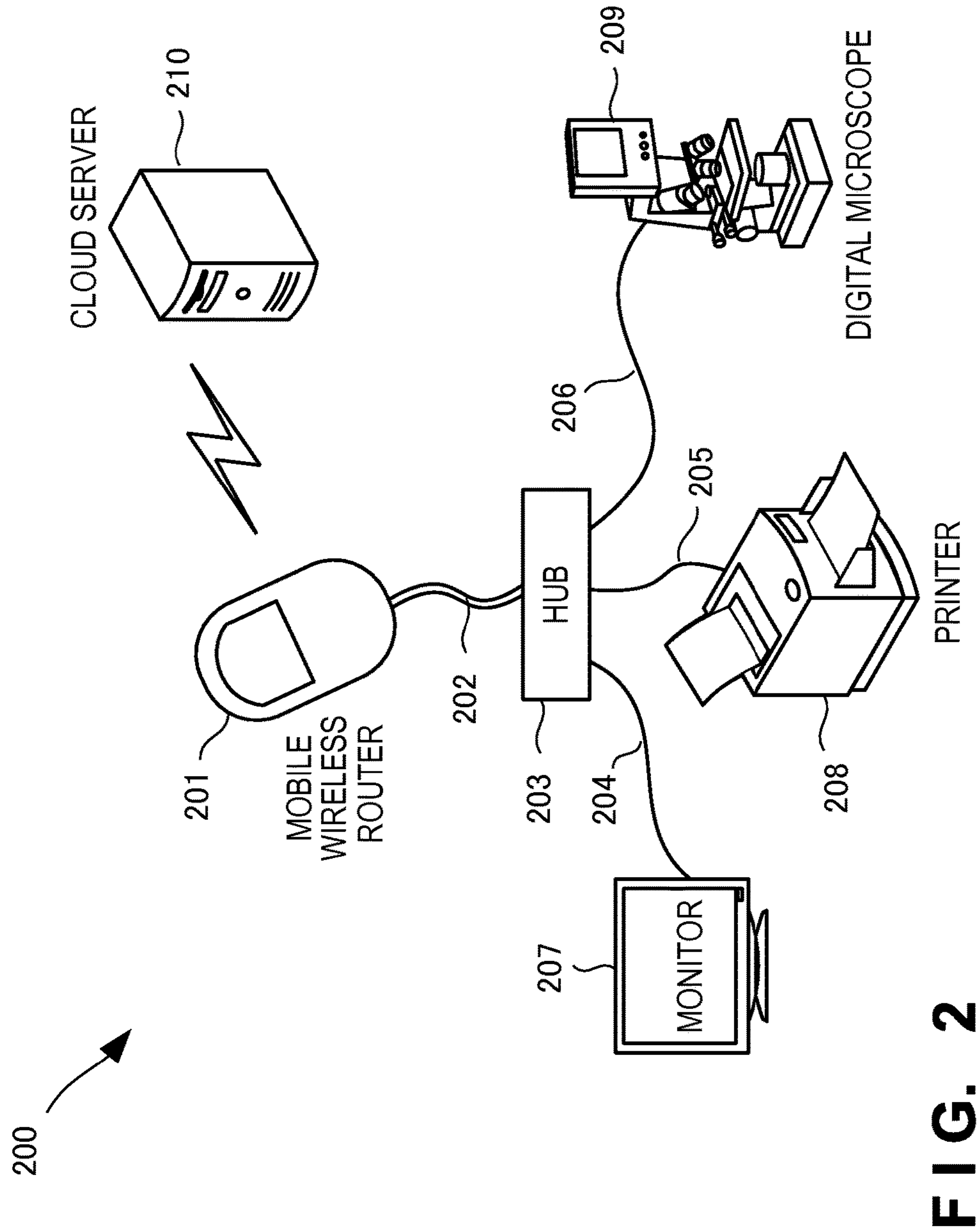
FIG. 2 is a block diagram showing the arrangement of an information processing system according to the second embodiment of the present invention.

An information processing system 200 according to the second embodiment of the present invention will be described next with reference to FIG. 2. FIG. 2 is a view for explaining the overall arrangement of the information processing system 200 according to this embodiment. As shown in FIG. 2, a mobile wireless router 201 that is an example of a communication apparatus is connected to a hub 203 via a USB interface 202. Next to the hub 203, the mobile wireless router 201 is connected to a monitor 207, a printer 208, and a digital microscope 209 via USB interfaces 204, 205, and 206, respectively. The mobile wireless router 201 is configured to be communicable with a cloud server 210 via the Internet using an antenna (not shown).

In this embodiment, the mobile wireless router having a wireless communication interface serving as an Internet protocol (to be referred to as IP hereinafter) interface and a USB interface serving as a non-IP interface will be explained. However, the present invention is not limited to this, and a communication apparatus such as a portable phone, for example, a smartphone, a tablet PC, or a notebook PC may be used if it has an IP interface and a non-IP interface. As a representative example, the digital microscope 209 serving as an input device and the monitor 207 and the printer 208 each serving as an output device are connected to the mobile wireless router 201 via the hub 203. These input and output devices are merely examples, and the present invention is not limited to these at all. For example, a digital camera, a digital video camera, a DVD player, or an IC recorder may be connected as an input device. A keyboard or a mouse may also be connected as an input device. The output device includes a speaker and a plotter in addition to the above-described devices.

The uses of the USB port of the mobile wireless router 201 are normally limited in advance to setting of the mobile wireless router 201 itself, log data output, USB storage connection, and the like. The functions of the USB interface are extended using the cloud server 210 so as to make the input and output devices such as the printer 208 usable without installing a device driver in the mobile wireless router 201.

The communication port provided in the mobile wireless router 201 is not limited to USB and can be any data communication interface (for example, serial communication interface, IEEE 1394, or HDMI) without using IP. An example of the wireless communication interface using IP is Wi-Fi® (wireless fidelity). A wireless communication interface using the IEEE 802.11 series (IEEE 802.11a, b, c, d, e) as a wireless communication standard may also be used.

<Internal Arrangement of Each Apparatus>

Figure 3A:
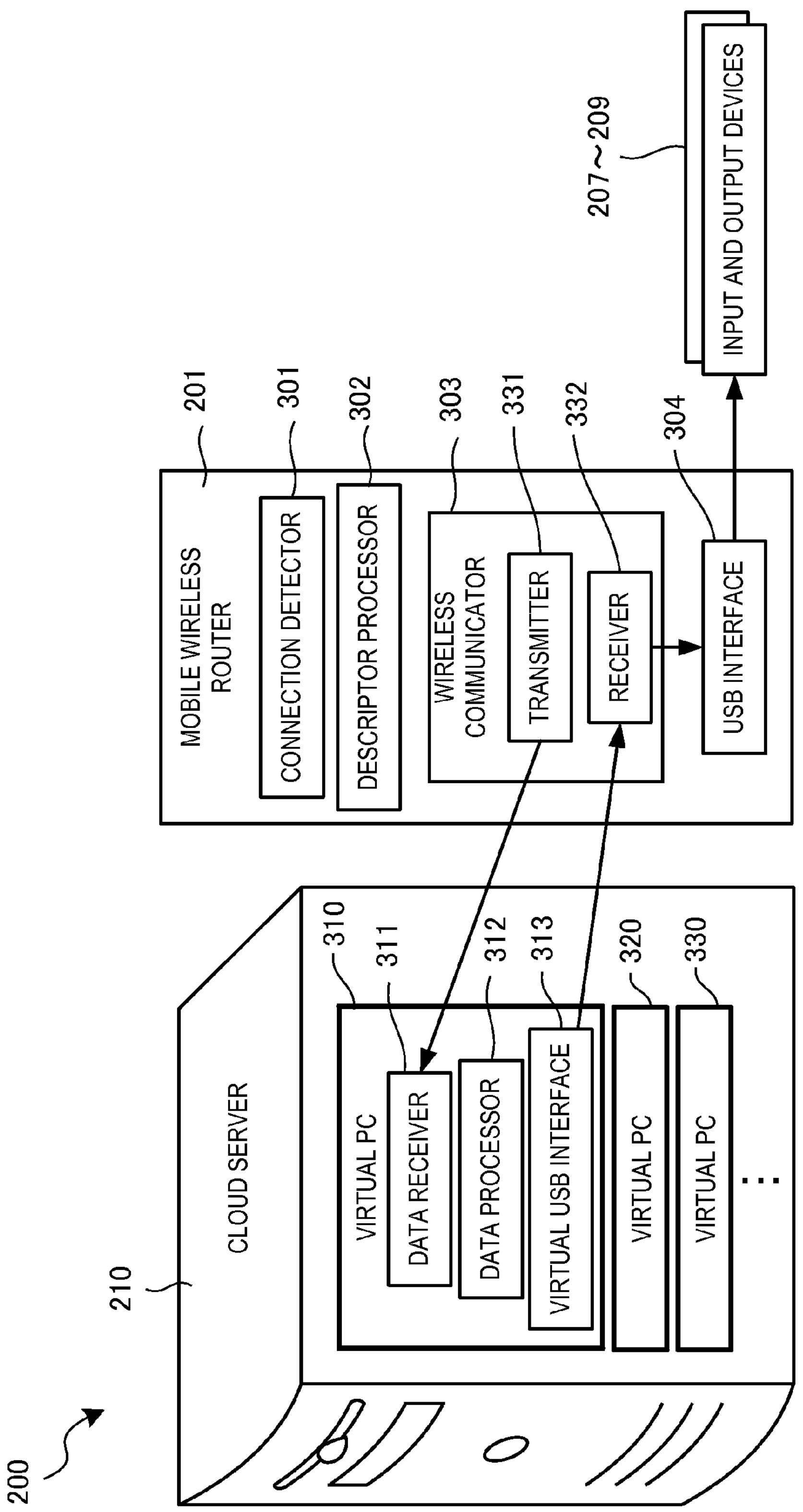
FIG. 3A is a block diagram showing the arrangement of the information processing system according to the second embodiment of the present invention.

A more detailed arrangement of the information processing system 200 will be described with reference to FIG. 3A. As shown in FIG. 3A, the cloud server 210 includes virtual PCs 310 to 330 for the respective contract users. Each of the virtual PCs 310 to 330 includes a data receiver 311 a data processor 312, and a virtual USB interface 313.

As shown in a table 350 of FIG. 3B, the cloud server 210 registers the identification information (the individual ID or MAC address of a mobile wireless router, or the like) of each communication apparatus connected to a virtual PC and the assigned virtual PC for each contract user. Hence, upon detecting access from a communication apparatus, the cloud server 210 can search for the communication apparatus from registered devices in the table 350 and specify the contract user and the virtual PC.

The mobile wireless router 201 includes a connection detector 301, a descriptor processor 302, a wireless communicator 303, and a USB interface 304. The wireless communicator 303 includes a transmitter 331 and a receiver 332.

The connection detector 301 detects connection of the input and output devices (monitor, printer, and digital microscope in this case) 207 to 209 via the USB interface 304 serving as a communication interface. The descriptor processor 302 acquires descriptors from the input and output devices 207 to 209 connected via the USB interface 304. The descriptor processor 302 also extracts device information (for example, device descriptors and interface descriptors) necessary for specifying the input and output devices 207 to 209. The extracted descriptors are transmitted from the transmitter 331 to the virtual PC 310.

The input and output devices 207 to 209 and a host such as the mobile wireless router 201 confirm USB transfer methods in the lowest physical layer, confirm descriptors in USB logical processing, and confirm plug-and-play protocols in the driver layer. Examples of USB transfer methods are control transfer, bulk transfer, interrupt transfer, and isochronous transfer. Matching of the physical communication mode is done between the device and the host by mutually confirming which one of the methods is to be employed.

On the other hand, the device and the host exchange device descriptors, configuration descriptors, interface descriptors, and endpoint descriptors as descriptors that are information for USB logical port control.

A device descriptor is information such as a vendor ID or product ID used to identify a device. A configuration descriptor is the USB configuration information of a target, and includes the number of interface descriptors. An interface descriptor is information of an interface, and includes the number of endpoint descriptors of the interface. An endpoint descriptor is the information of an endpoint that is a port for communication.

When the input and output devices 207 to 209 are connected to the USB interface 304, the host requests descriptors of the input and output devices 207 to 209 from the USB interface 304. The input and output devices 207 to 209 respond to the request by device descriptors and the like. When they are transmitted to the virtual PC 310 of the cloud server 210, the virtual USB interface 313 can grasp the profiles of the input and output devices 207 to 209.

If there is no description of device class, subclass, and protocol in the device descriptor, confirmation may be done by an interface descriptor. Alternatively, confirmation may be done by an environment variable $INTERFACE from the side of the mobile wireless router 201.

The transmitter 331 of the wireless communicator 303 transmits the device descriptor and data acquired from the input device to the cloud server 210. The data receiver 311 of the virtual PC 310 receives the data (content data and manipulation data) from the mobile wireless router 201. The data processor 312 performs, for the received data, processing predetermined in correspondence with the combination of the input and output devices 207 to 209. For example, the data processor 312 performs processing for image data input from the digital microscope 209 and received via the mobile wireless router 201 and converts it into a data format outputtable from the monitor 207 or the printer 208. The virtual USB interface 313 encapsulates the converted data into data of the USBoverIPnetwork format and transmits it to the receiver 332 of the mobile wireless router 201. The receiver 332 decapsulates the received data of the USBoverIPnetwork format into USB data and transmits it to the input and output devices 207 to 209.

<Sequence of Overall Processing>

Figure 4:
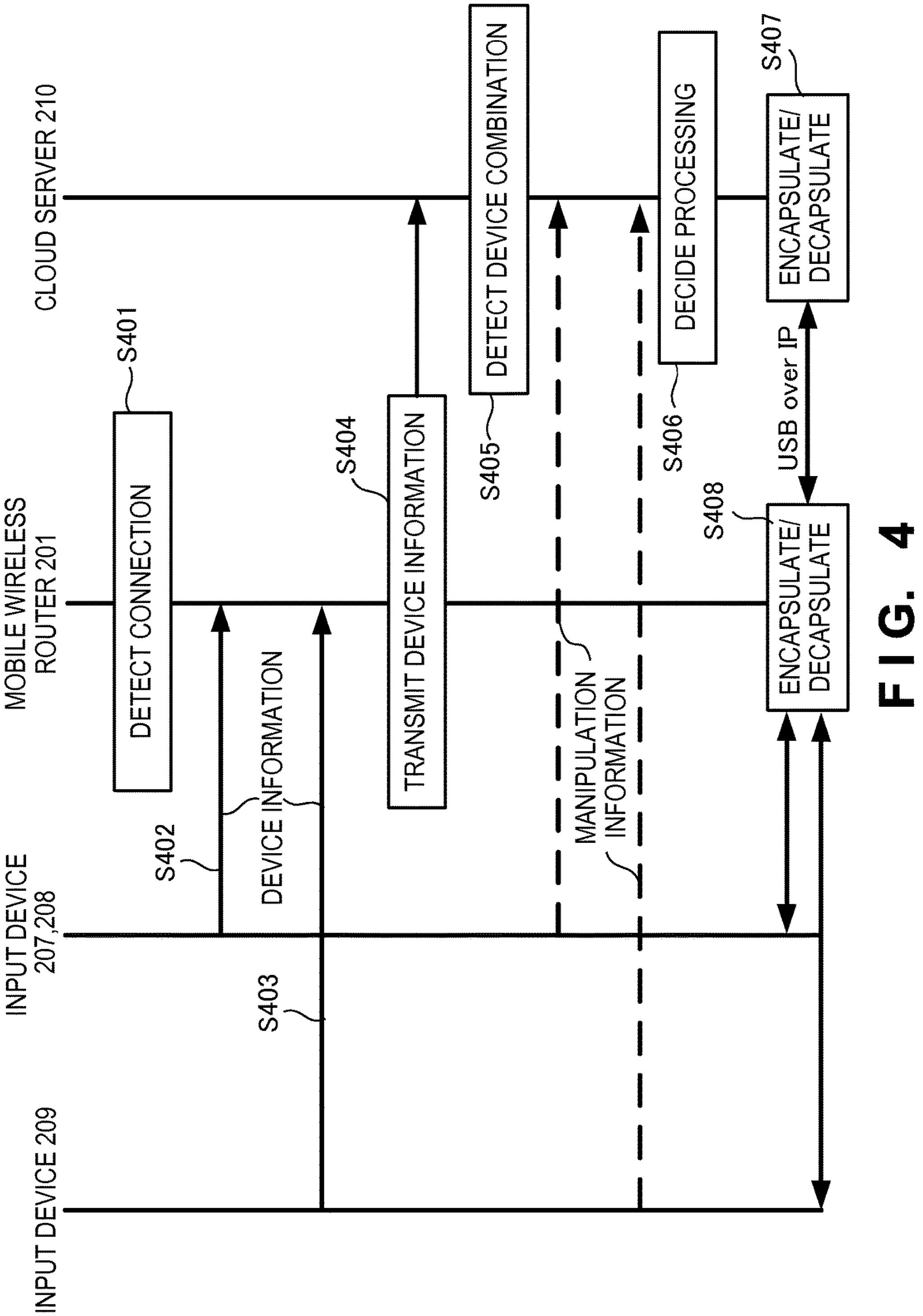
FIG. 4 is a sequence chart for explaining the sequence of overall processing of the information processing system according to the second embodiment of the present invention.

The sequence of overall processing of the information processing system 200 will be described with reference to FIG. 4. FIG. 4 is a sequence chart showing the sequence of overall processing of the information processing system 200. First, the mobile wireless router 201 detects connection to input and output devices (S401).

When the input and output devices 207 to 209 are connected to the USB ports of the mobile wireless router 201, the mobile wireless router 201 assigns addresses to the input and output devices 207 to 209 and requests descriptors. The input and output devices 207 to 209 of which the descriptors are requested transmit internally preset device descriptors and configuration descriptors.

The mobile wireless router 201 acquires the device information from the input and output devices 207 to 209 (S402, S403), and sends the acquired device information to the cloud server 210 (S404). In normal USB connection, the communication apparatus searches for an incorporated device driver based on the descriptors transmitted from the input and output devices, drives the device driver, and causes it to execute USB communication. In this case, however, upon receiving the device information transmitted from the input and output devices 207 to 209, the mobile wireless router 201 transmits the device information to the virtual PC 310 in the cloud server 210 via an IP network interface such as Ethernet®.

The virtual PC 310 extracts the information of the device descriptor from the received data and specifies and drives a device driver installed in the virtual PC 310 in advance. The input and output devices 207 to 209 can easily be used only by connecting them without installing the device driver in the mobile wireless router 201.

The virtual PC 310 of the cloud server 210 detects the combination of the input and output devices 207 to 209 connected to the mobile wireless router 201 using the received device information (S405).

The cloud server 210 decides processing associated with the detected combination of the input and output devices 207 to 209 (S406). Processing here includes not only data format conversion processing but also processing of converting the manipulation data of the input and output devices 207 to 209 into command data of the input and output devices 207 to 209.

In step S407, the virtual USB interface 313 of the cloud server 210 encapsulates the processed data into data of the USBoverIPnetwork format and transmits it to the mobile wireless router 201. The virtual USB interface 313 also decapsulates data acquired from the input and output devices 207 to 209 and processes the data (for example, stores the data in the storage of the server 210). In step S408, the mobile wireless router 201 decapsulates data received from the cloud server 201 and transmits the data to the input and output devices 207 to 209, and on the other hand, encapsulates data acquired from the input and output devices 207 to 209 and transmits the data to the cloud server 210.

<Device Information Acquisition Method>

Figure 5A:
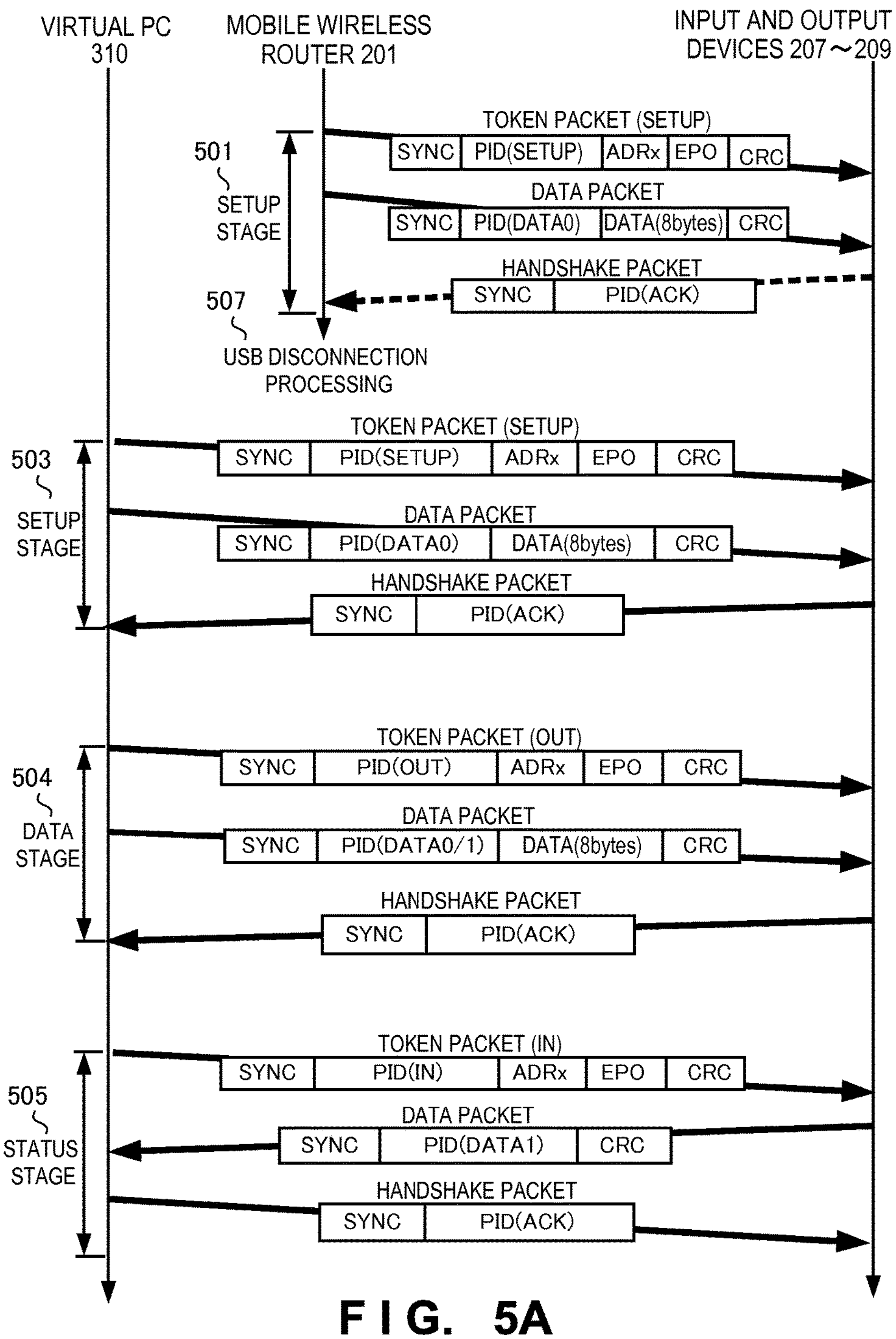
FIG. 5A is a view showing data exchange in the information processing system according to the second embodiment of the present invention.
Figure 5B:
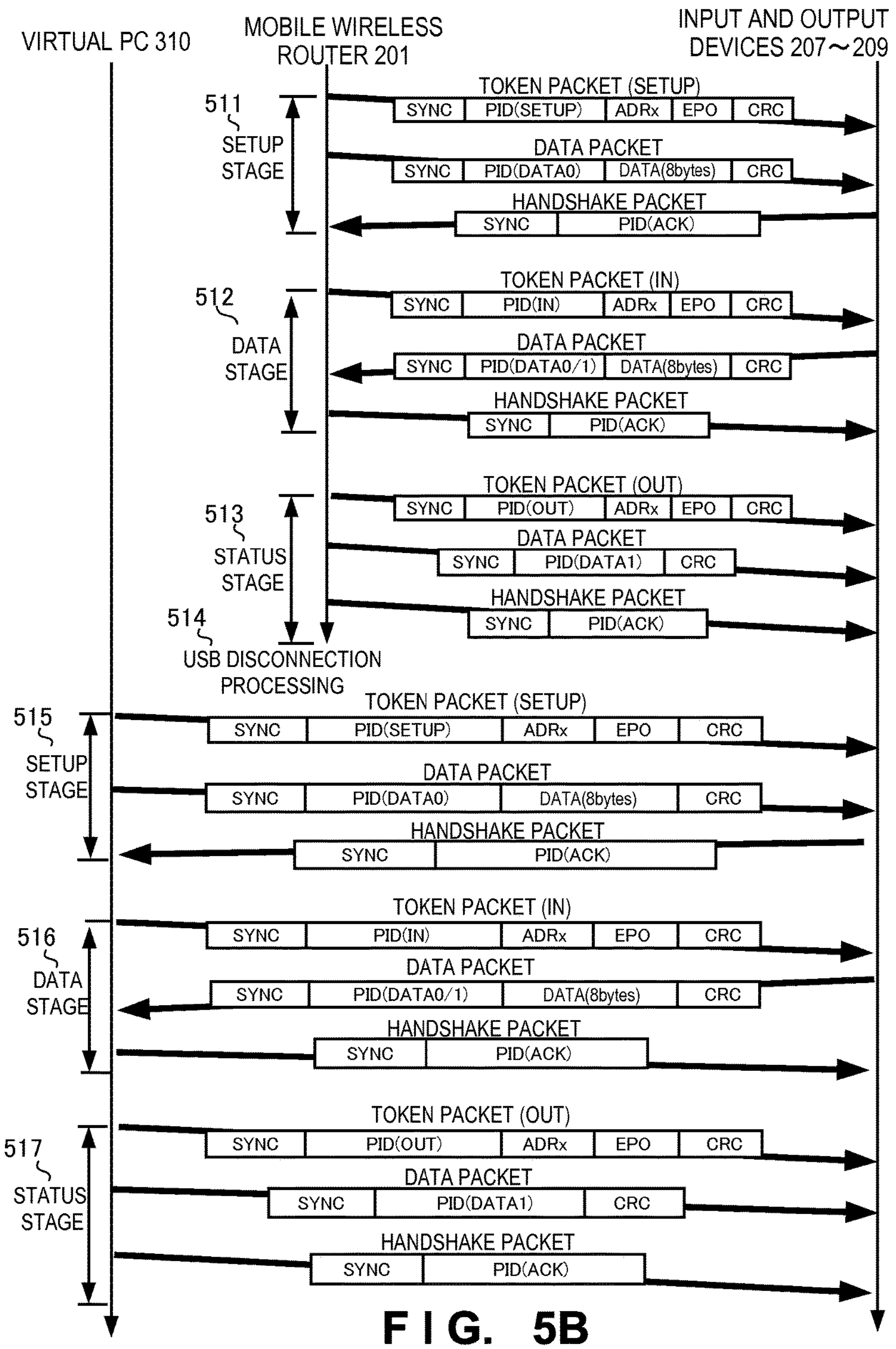
FIG. 5B is a view showing data exchange in the information processing system according to the second embodiment of the present invention.
Figure 6:
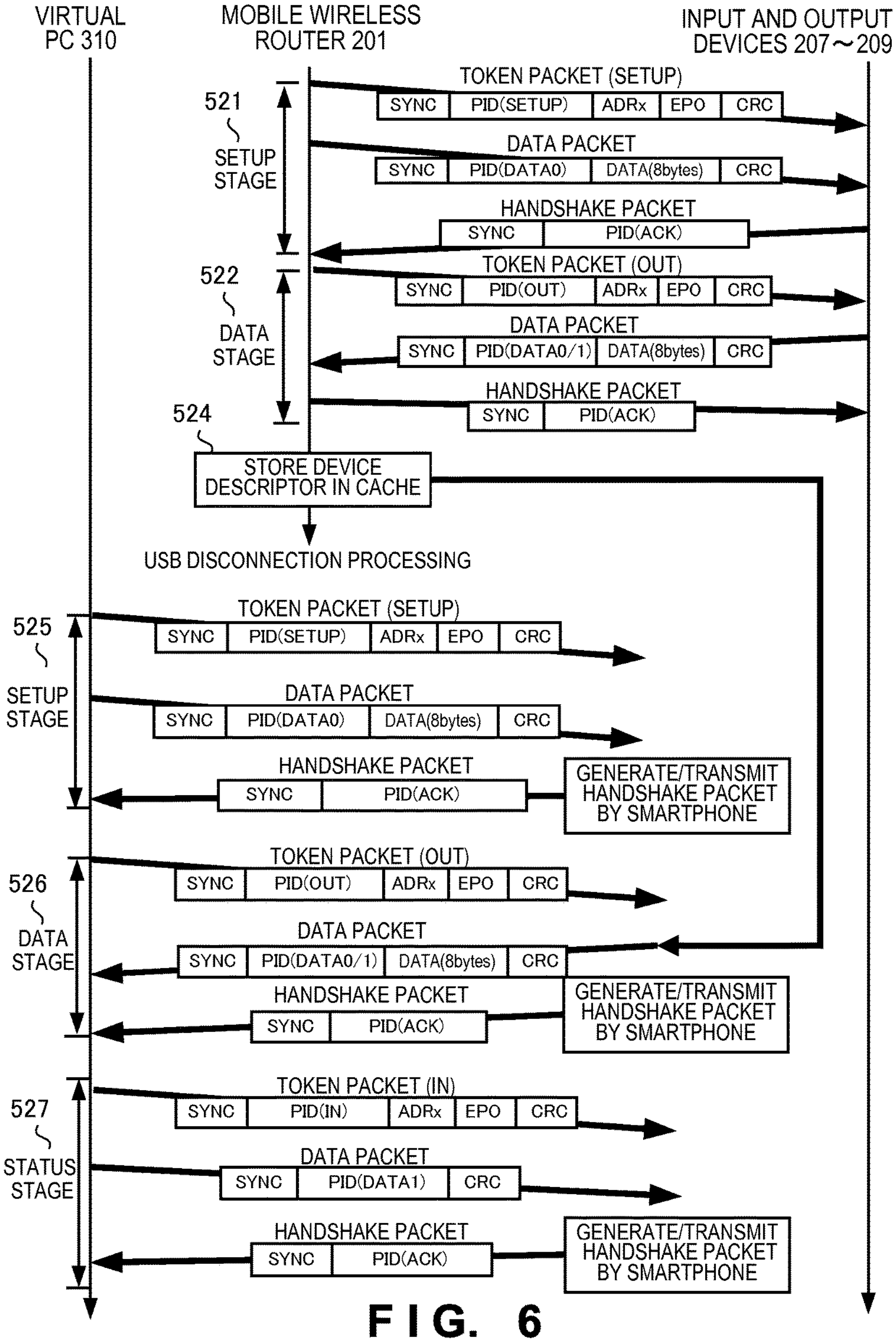
FIG. 6 is a view showing data exchange in the information processing system according to the second embodiment of the present invention.

FIGS. 5A, 5B, and 6 are views for explaining details of descriptor exchange described concerning steps S402 and S403. These drawings show packet data exchanged between the virtual PC 310, the mobile wireless router 201, and the input and output devices 207 to 209.

FIG. 5A illustrates the sequence when the input and output devices cannot properly be detected. First, when the mobile wireless router 201 and the input and output devices 207 to 209 are connected, the mobile wireless router 201 transmits a token packet and a data packet to each of the input and output devices 207 to 209 in a setup stage 501. In response to this, each of the input and output devices 207 to 209 transmits a handshake packet to the mobile wireless router 201. The mobile wireless router 201 determines, depending on whether a proper handshake packet is returned, whether the local device can control the input and output devices 207 to 209.

For example, a device that is assumed in advance to be connected to the mobile wireless router 201 returns a proper handshake packet, and a data stage and a status stage continue. The mobile wireless router 201 can control the input and output devices by driving internally prepared device drivers in correspondence with thus acquired device descriptors. However, the mobile wireless router 201 assumes connection of only few devices. If no handshake packet is returned in the setup stage 501, USB disconnection processing is performed (507).

Next, the virtual PC 310 performs a setup stage 503 for the input and output devices 207 to 209 again via the mobile wireless router 201 and advances to a data stage 504, thereby acquiring device information such as device descriptors. The virtual PC 310 holds many drivers and data conversion modules in advance so as to be connectable to various input and output devices existing in the society. For this reason, the setup stage 503, the data stage 504, and a status stage 505 smoothly progress between the virtual PC 310 and the input and output devices 207 to 209, and connection to the input and output devices 207 to 209 properly establishes.

FIG. 5B illustrates the sequence when the mobile wireless router 201 does not hold drivers corresponding to the device descriptors acquired from the input and output devices 207 to 209. In this case, a setup stage 511, a data stage 512, and a status stage 513 are performed between the mobile wireless router 201 and the input and output devices 207 to 209. Upon determining by the three stages that the mobile wireless router 201 does not hold drivers corresponding to the acquired device descriptors, USB disconnection processing 514 is performed.

The mobile wireless router 201 requests the virtual PC 310 to connect the input and output devices 207 to 209. After the USB connection between the mobile wireless router 201 and the input and output devices 207 to 209 is disconnected, the virtual PC 310 performs a setup stage 515, a data stage 516, and a status stage 517.

As shown in FIG. 6, the device descriptor and the handshake packet acquired from output devices 207 to 209 by a setup stage 521 and a subsequent data stage 522 between the mobile wireless router 201 and the output devices 207 to 209 may be cached in the mobile wireless router 201 (524).

After that, the mobile wireless router 201 and the output devices 207 to 209 are temporarily disconnected, connection establishment processing to the output devices 207 to 209 is started under the initiative of a virtual PC 310 (525). In this case, the mobile wireless router 201 generates and transmits a handshake packet in a setup stage 715 without sending a token packet and a data packet for setup to the output devices 207 to 209. In a data stage 526, upon receiving the token packet and the data packet from the virtual PC 310, the mobile wireless router 201 reads out the device descriptor from the cache and transmits it to the virtual PC 310 without sending the packets to the output devices 207 to 209. That is, since processing of acquiring the device descriptor from the output devices 207 to 209 can be omitted, resumption after disconnection of communication with the output devices 207 to 209 can efficiently be performed.

(Hardware Arrangement of Cloud Server)

Figure 7:
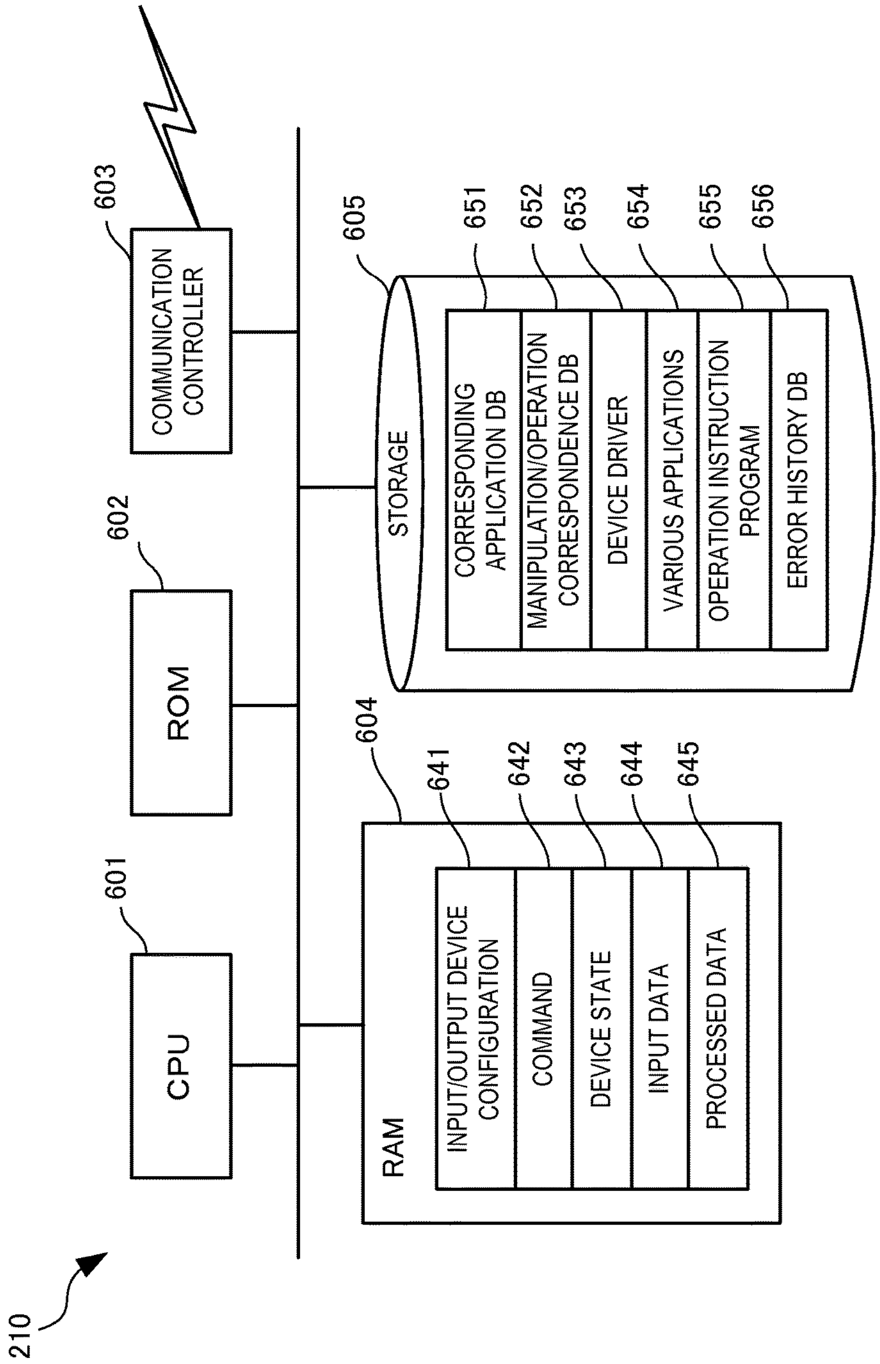
FIG. 7 is a block diagram showing the hardware arrangement of the cloud server according to the second embodiment of the present invention.

The hardware arrangement of the cloud server 210 will be described with reference to FIG. 7. The cloud server 210 includes a CPU 601, a ROM 602, a communication controller 603, a RAM 604, and a storage 605. The CPU 601 is a central processor and controls the entire cloud server 210 by executing various programs. The ROM 602 is a read only memory and stores various kinds of parameters in addition to a boot program to be executed by the CPU 601 first. The RAM 604 is a random access memory and temporarily stores various kinds of data. In this case, the RAM 604 stores an input/output device configuration 641, a command 642 representing a manipulation performed in the input and output devices 207 to 209, a device state 643 representing what kind of state the input and output devices 207 to 209 have, input data 644, and processed data 645.

On the other hand, the storage 605 stores a corresponding application database 651 used to decide an application to be driven in the virtual PC 310. FIG. 8 shows an example of the corresponding application database 651. As shown in FIG. 8, for example, when only a digital camera and a monitor are connected to the mobile wireless router 201, the virtual PC 310 activates an image editing application and displays the screen of the application on the monitor. On the other hand, when only a digital camera, a monitor, a keyboard, and a mouse are connected to the mobile wireless router 201, the virtual PC 310 activates a web browser and displays a screen in a state in which a blog URL is accessed on the monitor. When only a keyboard and a monitor are connected, the virtual PC 310 activates a text editing application and displays the editing screen on the monitor. These activated applications are set in the virtual PC 310 by default in advance and configured to allow the user to change the settings. The user's past use history of the virtual PC 310 may be accumulated, and the correspondence relationship between the input and output devices 207 to 209 and applications to be activated may be updated from the past history. The virtual PC 310 may prepare the corresponding application database 651 for each communication apparatus. That is, the application to be activated in the virtual PC 310 may change between a case where the user uses the mobile wireless router and a case where the user uses a smartphone. In that case, the cloud server 210 first specifies the communication apparatus of the user, and then specifies the input and output devices connected to the communication apparatus and activates an application corresponding to the combination of all devices.

Referring back to FIG. 7, the storage 605 also stores a manipulation/operation correspondence database 652. FIG. 9 shows an example of the manipulation/operation correspondence database 652. As shown in FIG. 9, the manipulation/operation correspondence database 652 decides how to control which input device or output device in accordance with the types of the input and output devices connected to the mobile wireless router 201 and manipulations for them.

For example, as shown in a column 801, when the print button of a printer is pressed in a state in which a general-purpose monitor, a general-purpose printer, and a general-purpose scanner are connected to the communication apparatus, the cloud server 210 controls the input and output devices such that an original is read by the scanner and printed. That is, the user can copy the original only by connecting the printer and the scanner to the mobile wireless router, setting the original, and pressing the print button without needing any settings at all. On the other hand, when a scanner button is pressed in the same state, a scanned image is displayed on the general-purpose monitor. At this time, a message "To print, press the print button of the printer" may be displayed on the general-purpose monitor under the control of the cloud server 210.

A column 802 shows a case where the monitor 207, the printer 208, and the digital microscope 209 are connected to the communication apparatus, as shown in FIG. 2. In this case, when the digital microscope 209 is powered on, a captured image is displayed on the monitor 207. When the print button of the printer is pressed in this state, the displayed image is printed. When the printer is provided with a small monitor, control may be done to display the image on the small monitor by the first switch and print the image by the second switch.

On the other hand, upon detecting connection of a general-purpose keyboard, a general-purpose monitor, and a general-purpose printer to the communication apparatus, as shown in a column 803, the virtual PC 310 automatically activates a text editing application. Upon detecting press of a key of the keyboard via the mobile wireless router 201, a character corresponding to the key is displayed on the monitor. Upon detecting press of the print button of the printer, the image displayed on the monitor is output to the printer.

Upon detecting connection of a general-purpose digital camera, a general-purpose monitor, and a general-purpose printer to the communication apparatus, as shown in a column 804, the virtual PC 310 activates an image editing application and displays an image stored in the digital camera. Upon detecting press of the print button of the printer, the image displayed on the monitor is output to the printer.

Upon detecting connection of a general-purpose DVD player and a general-purpose monitor to the communication apparatus, as shown in a column 805, the virtual PC 310 activates a DVD playback application, detects press of a DVD playback button, plays back a DVD, and displays a video on the monitor. Upon determining that a DVD drive and a monitor are connected to a PC, a router, a tablet, or the like, the cloud server determines that "when the combination of these devices is connected, the user surely wants to view a DVD on the monitor", and performs video playback processing in the virtual PC. At this time, if data conversion is necessary, the conversion is performed.

Upon detecting connection of a general-purpose IC recorder and a general-purpose speaker to the communication apparatus, as shown in a column 806, press of the playback button of the general-purpose IC recorder is detected, and an audio recorded in the recorder is output to the speaker.

As described above, the manipulation/operation correspondence database 652 stores a manipulation performed for an output device when the output device and a plurality of input devices are connected to the communication apparatus and an input device that should input data when the manipulation is performed in association with each other. The data receiver 311 receives data from an input device selected by referring to the manipulation/operation correspondence database 652.

On the other hand, the manipulation/operation correspondence database 652 stores a manipulation performed for an input device when the input device and a plurality of output devices are connected to the communication apparatus and an output device that should output data when the manipulation is performed in association with each other. The virtual USB interface 313 transmits processed data to an output device selected by referring to the manipulation/operation correspondence database 652.

Note that although combinations of general-purpose devices have been described here, the devices may be caused to perform specific operations corresponding to various kinds of manipulations by specifying the maker or serial number.

The virtual PC 310 may prepare the manipulation/operation correspondence database 652 for each communication apparatus. That is, the operation to be instructed by the virtual PC 310 in correspondence with a manipulation may change between a case where the user uses the mobile wireless router and a case where the user uses a smartphone. In that case, the cloud server 210 first specifies the communication apparatus of the user, and then specifies the input and output devices connected to the communication apparatus and instructs the input and output devices to do an operation corresponding to the combination of all devices.

The cloud server 210 may update the manipulation/operation correspondence database 652 or enable settings for performing a specific manipulation for each user using collective intelligence.

The cloud server 210 may store a combination of input and output devices and a data processing method to be performed between them in association with each other. For example, the encoding method for data input from a DVD player may be changed in accordance with the monitor.

Referring back to FIG. 7, the storage 605 stores a device driver 653 used to control the input and output devices, various applications 654 such as a text editing application, and an operation instruction program 655 used to transmit a command to the input and output devices.

The storage 605 may also store an error history database 656. The error history database 656 stores a failure that may occur and a solving method thereof for each combination of input and output devices connected to a communication apparatus such as the mobile wireless router 201. If a monitor is connected, the error state and the solving method are displayed on the monitor. The solving method is executed in accordance with a subsequent user manipulation. For example, a message "To display images on the monitor of maker B, you need to upgrade the firmware of the digital camera. Will you upgrade?" is displayed on the display screen of the digital camera of maker A. When the user manipulates the OK button in response to this, the latest firmware is downloaded from the virtual PC 310 to the digital camera to do updating.

The error history database 656 accumulates only the error history. However, the history may be accumulated for combinations of input and output devices that normally operated. This facilitates specifying a cause when a problem is posed.

As described above, according to this embodiment, the cloud server prepares a correspondence table of input and output devices, manipulations, and operations, and causes the input and output devices to operate in accordance with the table. This allows the user to very easily manipulate the input and output devices without any awareness of the existence of the cloud server or virtual PC. An output as desired can be obtained only by connecting devices and pressing a button.

In particular, even when a simple and compact communication terminal of low performance is used, the various kinds of input and output devices 207 to 209 can conveniently be used using the high performance of the cloud server 210.

For example, only by mounting a DVD medium on a DVD drive and connecting it to the mobile wireless router 201 without purchasing a network video, the virtual PC in the cloud server 210 automatically plays back the DVD and sends the display image data to the monitor 207. The user can easily appreciate a DVD only by connecting a DVD player and a monitor to the hub 203 and loading the DVD medium.

Additionally, for example, only by connecting the monitor 207 and the digital microscope 209 to the mobile wireless router 201 and manipulating the image capture button of the digital microscope 209 in a school, the user can hold a class while easily showing the image of the microscope to students.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program. In particular, the present invention incorporates at least a non-transitory computer readable medium.

This application claims the benefit of Japanese Patent Application No. 2012-068414 filed on Mar. 23, 2012, which is hereby incorporated by reference herein in its entirety.

The invention claimed is:

1. An information processing system comprising:

a communication apparatus including an Internet Protocol interface and a non-Internet Protocol interface, wherein the communication apparatus is configured to:

connect to a network through the Internet Protocol interface, and communicate with a first device and a second device through the non-Internet Protocol interface; and a server configured to communicate with the communication apparatus via the network, the server comprising:

a storage that stores:

device drivers for achieving communication between the first and second devices and the server, a mapping table that indicates that a first operation is to be performed by at least one of the first and the second devices in accordance to a second operation performed to one of the first and second devices, and history of errors or successes of the first operation performed by a combination of the first and second devices;

a memory that stores a set of instructions; and a hardware processor configured to execute the set of instructions to:

detect that the first and second devices are connected to the non-Internet Protocol interface of the communication apparatus;

determine that the first operation is to be performed by at least one of the first and the second devices based on the mapping table; and transmit instruction data to the communication apparatus to cause at least one of the first and the second devices to perform the first operation, wherein the communication apparatus communicates with the first and second devices by specifying and using the device drivers stored in the server, without installing the device drivers in the communication apparatus.

2. The information processing system according to claim 1, wherein the second operation is a user manipulation to the first device.

3. The information processing system according to claim 2, wherein the first device is an input device among a plurality of input devices connected to the communication apparatus, and the second device is an output device, and wherein the hardware processor of the server is configured to execute the set of instructions to receive input data from the first device after determining that the second operation is performed to one of the first and second devices.

4. The information processing system according to claim 1, wherein the first device is an input device and the second device is an output device among a plurality of output devices connected to the communication apparatus, and wherein the hardware processor of the server is configured to execute the set of instructions to transmit output data to the second device after determining that the second operation is performed to one of the first and second devices.

5. The information processing system according to claim 1, wherein the storage stores a second mapping table that associates an application with the first and second devices, and wherein the hardware processor of the server is configured to execute a set of instructions associated with the application after detecting the first and second devices are connected to the communication apparatus.

6. The information processing system of claim 1, wherein the server comprises a virtual machine pre-installed with one or more device drivers associated with the first and second devices.

7. The information processing system of claim 1, wherein the hardware processor of the server is configured to determine the first operation to be performed by at least one of the first and the second devices based on the history of errors or successes.

8. The information processing system of claim 7, wherein the storage further stores a solution associated with a failure of the first operation, and wherein the hardware processor of the server is configured to determine an operation to be performed by at least one of the first and the second devices based on the solution.

9. The information processing system of claim 1, wherein the first operation is to be performed by the combination of the first and second devices.

10. An information processing method performed by a server communicatively coupled with a communication apparatus over a network, wherein the communication apparatus includes an Internet Protocol interface and a non-Internet Protocol interface, and the communication apparatus is configured to connect to a network through the Internet Protocol interface, and communicate with a first device and a second device through the non-Internet Protocol interface, the information processing method comprising:

creating a mapping table that indicates that a first operation is to be performed by at least one of the first and the second devices in accordance to a second operation performed to one of the first and second devices;

storing device drivers for achieving communication between the first and second devices and the server;

storing history of errors or successes of the first operation performed by a combination of the first and second devices;

detecting the first and second devices are connected to the non-Internet Protocol interface of the communication apparatus;

determining that the first operation is to be performed by at least one of the first and the second devices based on the mapping table; and transmitting instruction data to the communication apparatus to cause at least one of the first and the second devices to perform the first operation, wherein the communication apparatus communicates with the first and second devices by specifying and using the device drivers stored in the server, without installing the device drivers in the communication apparatus.

11. A server for communicating, via a network, with a communication apparatus, wherein the communication apparatus includes an Internet Protocol interface and a non-Internet Protocol interface, and the communication apparatus is configured to connect to a network through the Internet Protocol interface, and communicate with a first device and a second device through the non-Internet Protocol interface, the server comprising:

a storage that stores:

device drivers for achieving communication between the first and second devices and the server, a mapping table that indicates that a first operation is to be performed by at least one of the first and the second devices in accordance to a second operation performed to one of the first and second devices, and history of errors or successes of the first operation performed by the combination of the first and second devices;

a memory that stores a set of instructions; and a hardware processor configured to execute the set of instructions to:

detect that the first and second devices are connected to the communication apparatus;

determine that the first operation is to be performed by at least one of the first and the second devices based on the mapping table; and transmit instruction data to the communication apparatus to cause at least one of the first and the second devices to perform the first operation, wherein the communication apparatus communicates with the first and second devices by specifying and using the device drivers stored in the server, without installing the device drivers in the communication apparatus.

12. The server according to claim 11, wherein the second operation is a user manipulation to the first device.

13. The server according to claim 12, wherein the first device is an input device among a plurality of input devices connected to the communication apparatus, and the second device is an output device, and wherein the hardware processor of the server is configured to execute the set of instructions to receive input data from the first device after determining that the second operation is performed to one of the first and second devices.

14. The server according to claim 11, wherein the first device is an input device and the second device is an output device among a plurality of output devices connected to the communication apparatus, and wherein the hardware processor of the server is configured to execute the set of instructions to transmit output data to the second device after determining that the second operation is performed to one of the first and second devices.

15. The server according to claim 11, wherein the storage stores a second mapping table that associates an application with the first and second devices, and wherein the hardware processor of the server is configured to execute a set of instructions associated with the application after detecting the first and second devices are connected to the communication apparatus.

16. A control method performed by a server communicatively coupled with a communication apparatus over a network, wherein the communication apparatus includes an Internet Protocol interface and a non-Internet Protocol interface, and the communication apparatus is configured to connect to a network through the Internet Protocol interface, and communicate with a first device and a second device through the non-Internet Protocol interface, the method comprising:

detecting that a first device and a second device are connected to the non-Internet Protocol interface of the communication apparatus;

receiving device drivers for achieving communication between the first and second devices and the servers;

receiving first data representing a mapping table that indicates that a first operation is to be performed by at least one of the first and the second devices in accordance to a second operation performed to one of the first and second devices;

receiving second data representing a second mapping table that associates a history of a status of the second operation with the first and second devices;

determining that the first operation is to be performed by at least one of the first and the second devices based on the first and second data; and transmitting instruction data to the communication apparatus to cause at least one of the first and the second devices to perform the first operation, wherein the communication apparatus communicates with the first and second devices by specifying and using the device drivers stored in the server, without installing the device drivers in the communication apparatus.

17. A non-transitory computer readable medium storing a set of instructions that, when executed by a hardware processor of a server, causes the server to execute a method, the method comprising:

detecting, based on data received from a communication apparatus over a network, that a first device and a second device are connected to a non-Internet Protocol interface of the communication apparatus, wherein the communication apparatus includes an Internet Protocol interface and the non-Internet Protocol interface, and the communication apparatus is configured to connect to the network through the Internet Protocol interface, and communicate with a first device and a second device through the non-Internet Protocol interface;

receiving device drivers for achieving communication between the first and second devices and the server;

receiving first data representing a mapping table that indicates that a first operation is to be performed by at least one of the first and the second devices in accordance to a second operation performed to one of the first and second devices;

receiving second data representing history of errors or successes of the first operation performed by a combination of the first and second devices;

determining that the first operation is to be performed by at least one of the first and the second devices based on the first and second data; and transmitting instruction data to the communication apparatus to cause at least one of the first and the second devices to perform the first operation, wherein the communication apparatus communicates with the first and second devices by specifying and using the device drivers stored in the server, without installing the device drivers in the communication apparatus.

18. The medium of claim 17, wherein the set of instructions that is executable by the hardware processor of server to cause the server to further perform: determining the operation to be performed by at least one of the first and the second devices based on the history of errors or successes.

19. The medium of claim 18, wherein the second data further includes a solution associated with a failure of the second operation, and wherein the set of instructions that is executable by the hardware processor of the server to cause the server to perform: determining an operation to be performed by at least one of the first and the second devices based on the solution.

20. The medium of claim 17, wherein the first operation is to be performed by the combination of the first and second devices.

* * * * *